Nov. 1, 1966
P. T. TIDDENS
3,281,961
GLOBE STRUCTURE
Filed Sept. 4, 1964
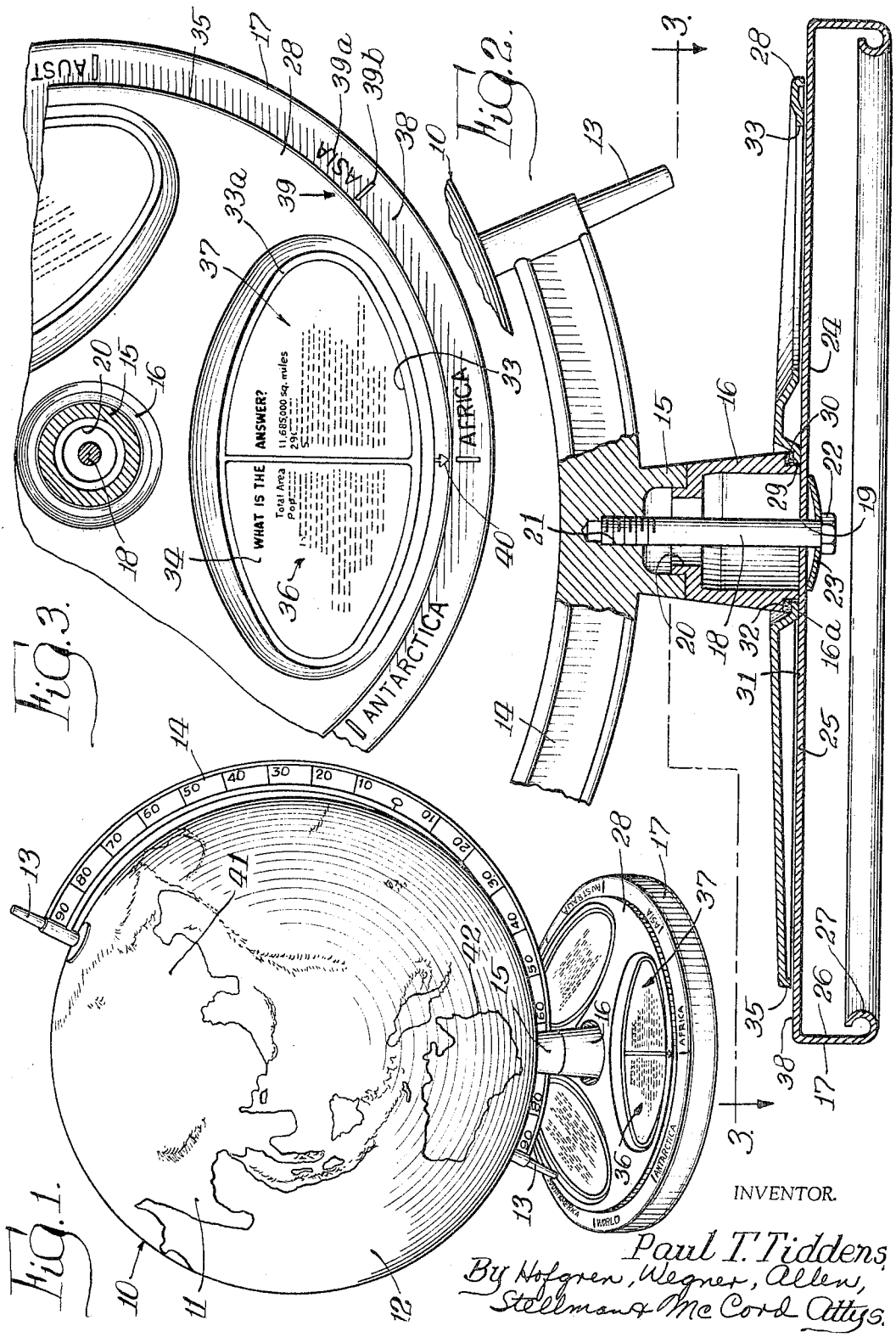
INVENTOR.
Paul T. Tiddens,
By Hofgren, Wegner, Allen,
Stellman & McCord Attys.

# United States Patent Office 3,281,961
Patented Nov. 1, 1966

3,281,961
GLOBE STRUCTURE
Paul T. Tiddens, Northbrook, Ill., assignor to Rand McNally & Company, a corporation of Illinois
Filed Sept. 4, 1964, Ser. No. 394,542
5 Claims. (Cl. 35—9)

This invention relates to globes and in particular to globes representing bodies, such as the earth.

In one form of conventional globe for representing bodies, such as the earth, a globe ball simulating the earth's surfaces is mounted on a meridian ring for rotation about the polar axes. The meridian ring is in turn mounted on a post carried on a suitable base. For use in conjunction with such a globe, information booklets have been provided which discuss the features represented by the globe. The present invention is concerned with the provision of such a globe having new and improved means for correlating information on the globe ball with question and answer means associated with the base, thereby providing an improved educational tool as well as an improved globe means for use in the conventional manner.

Thus, a principal feature of the present invention is the provision of a new and improved globe structure.

Another feature of the invention is the provision of such a globe structure having new and improved means for associating information means with the globe ball representations.

A further feature of the invention is the provision of such a globe structure wherein the information is presented in the form of question and answer set means.

A still further feature of the invention is the provision of such a globe structure wherein the question and answer set means includes means for selective exposure and covering of different portions thereof for facilitated use as an educational tool.

A yet further feature of the invention is the provision of such a globe structure comprising a meridian support, a world globe ball, means for rotatably carrying the globe ball on the support for rotation of the globe ball about the polar axis thereof, a base, means for rotatably mounting the support on the base, a shutter selectively movably carried on the base, a question set movable with the shutter, a plurality of answer sets on the base observable selectively as a result of the selective movement of the shutter on the base, the answer sets being registered with the question sets on the shutter, and the answer sets including answers referring to geographical designations, indicia on the base corresponding to preselected geographical positions on the world globe ball, aligning indicia means on the shutter for indicating the position of the shutter for viewing a selected one of the answer sets corresponding to a selected one of the geographical area indicia, indicia on the world globe ball corresponding to geographical designations in the answer sets, and indicia on the world globe ball corresponding to the geographical position indicia on the base.

Still another feature of the invention is the provision of such a globe structure wherein the globe ball comprises a world globe and wherein the indicia and question and answer sets relate to geographical facts.

Other features and advantages of the invention will be apparent from the following description taken in connection with the accompanying drawings wherein:

FIGURE 1 is a perspective view of a globe ball structure embodying the invention;

FIGURE 2 is a vertical diametric section thereof; and

FIGURE 3 is a horizontal section thereof taken substantially along the line 3—3 of FIGURE 2.

In the exemplary embodiment of the invention as disclosed in the drawings, a globe ball generally designated 10 herein comprising a world globe ball having land area representations 11 and sea area representations 12, is provided with polar pivots 13 carried at the distal ends of a support 14 herein comprising a semi-meridian ring.

As illustrated in FIGURE 2, the pivots 13 are arranged to dispose the polar axis of the globe ball at the angle of the ecliptic, i.e. approximately 23½ degrees to the vertical. The semi-meridian ring is provided with a depending boss 15 which is carried on a mounting extension 16 upstanding from a base 17.

The meridian ring 14 is locked to the extension 16 and base 17 by means of a bolt 18 extending through an opening 19 in the base 17 and an opening 20 in the extension 16 and threaded upwardly into a threaded recess 21 in the lower portion of the meridian ring. The head of the bolt 22 engages a spring washer 23 which is urged against the underside 24 of a circular mid-portion 25 of the base 17 to retain the bolt against loosening on the base. As shown, the base may be provided with a depending annular rim 26 having a turned lower edge 27 for spacing the circular portion 25 above the plane of the edge 27.

Mounted on the base for rotation about the axis of the extension 16 is a shutter 28 herein comprising a disc having a central opening 29 loosely fitting a reduced diameter lower end portion 30 of the extension 16 which bears against the upper surface 31 of the base portion 25. An annular washer 32 is disposed between the disc 28 and the extension 16 for facilitating rotational movement of the disc about the extension portion 29. As shown in FIGURE 2, the inner portion of the disc and the overlying annular washer 32 are received in a downwardly opening recess 16a which has a preselected height so as to provide a preselected pressure acting through the washer on the disc to provide a preselected resistance to rotation of the disc about the axis of the extension. Thus, as the extension 16 bears against the upper surface 31 of the base portion 25, the pressure acting through the washer is limited notwithstanding variations of the tension applied through the bolt 18 in the assembly of the globe structure.

As best seen in FIGURE 3, the disc is provided with an oval shaped opening 33. One-half of opening 33 is closed by a plate portion 34, whereby the other half of the opening defines a window through which the upper surface 31 of the base is observable. In the instant structure, the plate portion 34 is formed integrally with the disc 28. The inner edge 33a of the disc defining the opening 33 is downturned to define a flange which provides an improved fingertip manipulating portion of the disc for facilitated rotation thereof about the axis of the extension 16. As shown in FIGURE 2, the peripheral edge of the disc 28 is downturned at 35 to slide on the upper surface 31 of the base portion 25. Thus, the disc 28 is selectively rotatably positionable about the extension 16 so as to dispose the opening 33 selectively over different portions of the base surface 31 as desired.

In the illustrated world globe structure, a set 36 of questions is provided on the plate 34. Illustratively, as shown herein, the questions relate to geographical facts. At circumferentially spaced portions of the base surface 31, sets 37 of answers corresponding to the questions set 36 are provided with the respective answers of each set being aligned with the respective appropriate question of the question set 36. On the perimeter portion 38 of the base surface 31 radially outwardly of the disc edge 35 is provided a circumferentially arranged series of geographical indicia 39, herein comprising the names 39a of the different continents, and a reference line 39b associated with each continent name. The indicia 39 herein also includes the designation "World" with a reference line associated therewith. A suitable aligning indicia 40 in the form of an arrow is provided on the disc adjacent the edge 35 for registration selectively with the different reference lines 39b as desired by the user. Thus, as shown in FIGURE 3 when the aligning indicia 40 is aligned with a selected reference line, for example, that associated with the name of the continent "Africa," the window 33 overlies the answer set 37 corresponding to "Africa." Similarly, when the aligning indicia 40 is aligned with the other indicia lines, the uncovered answer set corresponds to the associated continent or world designation.

Still further, the globe is correlated with the information included in each of the answer sets 37 as well as with the indicia 39. More specifically, the geographical locations 41, such as the countries, points of lowest and highest elevation, points of lowest and highest recorded temperatures, largest body of water, largest metropolitan center, and longest river of each of the indicated continents and world, are set forth by means of the indicia on the globe ball so that direct reference may be had between the answer sets 37 and the corresponding geographical representations on the globe ball. Further, each of the continent names of indicia 39 are set forth as continent designations 42 on the globe ball.

Thus, in the instant globe structure, a correlation is provided between the respective geographical locations 41 and 42, the answer sets 37, and the indicia 39 in a novel and simple manner. This correlation provides an improved facility in the use of the globe structure as an educational tool. In addition, the globe ball may be provided with other geographical designations as desired to provide a globe ball having substantial information thereon for use in the conventional reference manner.

The globe structure as discussed above has been illustrated with reference to a world globe ball. Obviously, the globe ball may comprise a celestial globe or other stellar, planetary, or satellite globe ball representations as desired. Also, it should be understood that the question sets may refer to ocean information as well as land information as in the illustrative example.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A globe structure comprising:
   a support;
   a globe ball;
   means for carrying the globe ball on said support for rotation about an axis;
   a base;
   means for mounting the support on said base;
   a shutter selectively carried on said base for rotation about said axis;
   a question set movable with said shutter and arranged to be read from radially outwardly thereof relative to said axis;
   a plurality of answer sets on said base observable selectively as a result of the selective movement of said shutter on said base, said answer sets being registered with the question sets on said shutter and arranged to be read from radially outwardly thereof relative to said axis adjacent said shutter;
   indicia on said base corresponding to preselected portions of said globe ball;
   aligning indicia means on the shutter for indicating the position of the shutter for viewing a selected one of said answer sets corresponding to a selected one of said indicia on said base;
   indicia on the globe ball corresponding to information in the answer sets; and
   indicia on the globe ball corresponding to said indicia on said base, whereby each of said question set, a selected answer set, said aligning indicia means, a selected indicium on the base, said indicia on the globe ball corresponding to information in the selected answer set, and the indicia on the globe ball corresponding to the selected indicia on the base are readable from a single position radially outwardly thereof relative to said axis.

2. The globe structure of claim 1 wherein said indicia on the base includes a reference line associated with each indicium for selective alignment of said aligning indicia means on the shutter therewith.

3. The globe structure of claim 1 wherein said shutter includes an opening having a depending wall for facilitated manipulation of the shutter.

4. The globe structure of claim 1 wherein said support comprises a meridian support, said globe ball comprises a world globe ball, said means for carrying the globe ball on said support carries it for rotation about the polar axis thereof, said answer sets include answers referring to geographical designations, said indicia on said base correspond to preselected geographical positions on said world globe ball, said indicia on the world globe ball correspond to geographical designations in the answer sets, and said indicia on the world globe ball correspond to the geographical positions indicia on said base.

5. The globe structure of claim 1 further including means for providing a preselected resistance to movement between said shutter and said base, and means extending transversely to said shutter for manipulation thereof to move said shutter against the resistance of said last-named means.

References Cited by the Examiner

UNITED STATES PATENTS

| | | | |
|---|---|---|---|
| 386,399 | 7/1888 | Goldthwaite | 35—46 |
| 387,957 | 8/1888 | Moreon et al. | 35—46 |
| 2,020,284 | 11/1935 | Beck | 35—46 |
| 2,560,647 | 7/1951 | Higgins | 35—74 |
| 3,016,629 | 1/1962 | Case | 35—46 |

EUGENE R. CAPOZIO, *Primary Examiner.*

S. M. BENDER, *Assistant Examiner.*